United States Patent

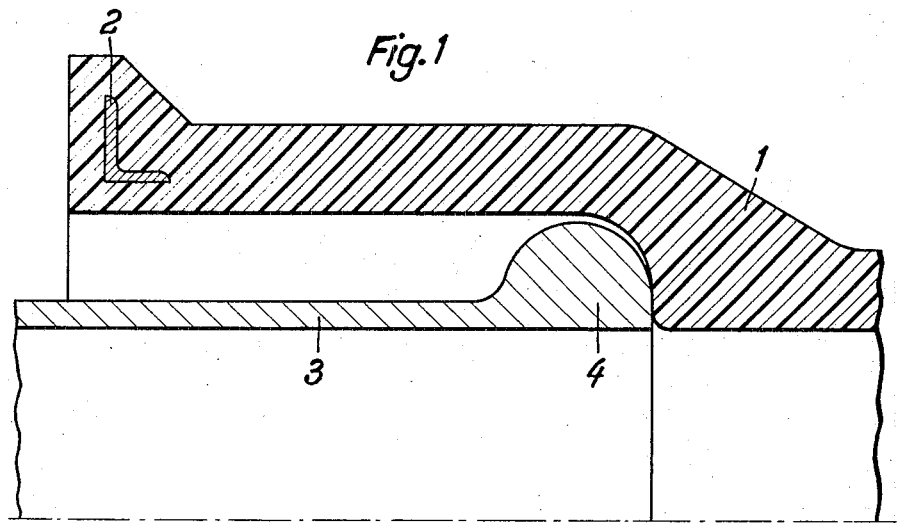
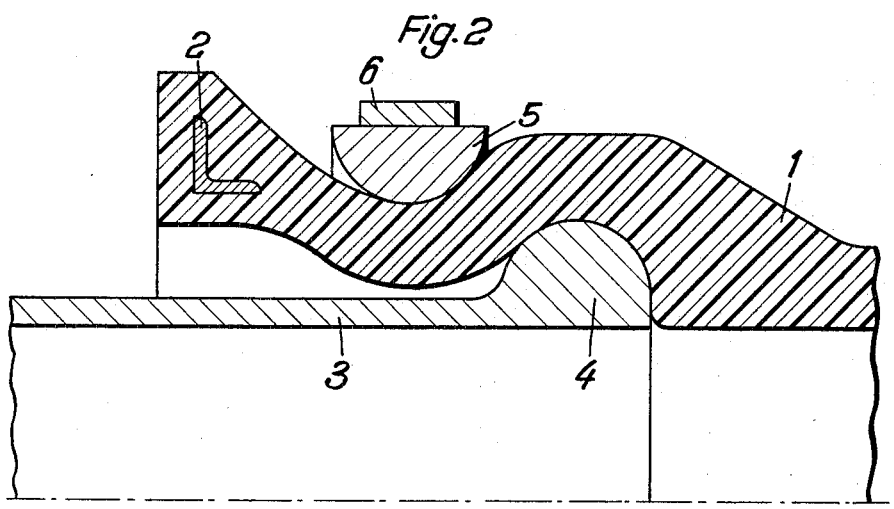

[11] 3,540,759

| [72] | Inventor | Klaus Schneider Hamburg, Hausbruch, Germany |
|---|---|---|
| [21] | Appl. No. | 806,866 |
| [22] | Filed | March 13, 1969 |
| [45] | Patented | Nov. 17, 1970 |
| [73] | Assignee | Firma Eddelbuttel & Schneider Hamburg-Sinstorf-Fleestedt, Germany a corporation of Germany |
| [32] | Priority | March 14, 1968 |
| [33] | | Germany |
| [31] | | No. 1,675,298 |

[54] HOSE CONNECTION COUPLING
5 Claims, 2 Drawing Figs.

[52] U.S. Cl. .................................................. 285/238, 285/420, 285/423
[51] Int. Cl. ..................................................... F16l 33/00
[50] Field of Search ........................................ 285/8, 174, 238, 233, 235, 236, 239, 242, 243, 244, 252, 253, 260, 399, 423, 420

[56] References Cited
UNITED STATES PATENTS

| 1,514,412 | 11/1924 | Wilkinson ..................... | 285/252X |
| 2,304,114 | 12/1942 | Moore ........................... | 285/8 |
| 3,236,546 | 2/1966 | Cranskens ..................... | 285/238 |
| 3,276,620 | 10/1966 | Dorfman ....................... | 285/252X |
| 3,303,669 | 2/1967 | Oetiker ......................... | 285/252X |

FOREIGN PATENTS

| 19,993 | 0/1913 | Great Britain ................ | 285/242 |
| 51,751 | 8/1939 | Great Britain ................ | 285/7 |

*Primary Examiner*—Dave W. Arola
*Attorney*—Ernest G. Montague

ABSTRACT: A hose connection coupling for connection of a hose having a large diameter, made of rubber or rubberlike working material, which hose is flexible and reinforced by a textile fabric or equivalent material for high operational pressures to hose connection branches or rigid tubular conduits. The end of the tubular conduits or of the connection branches has an outwardly extending strong bead. The inner diameter of the end of the hose is slightly larger than the largest diameter of the bead. The hose has in its end range a stiffening means retaining the diameter and assuming the forces transmitted from the textile fabric or equivalent material of the hose. A clamplike member constricts the hose in its coupled position between the bead and the stiffening means. The inner diameter of the constriction is substantially smaller than the largest diameter of the bead.

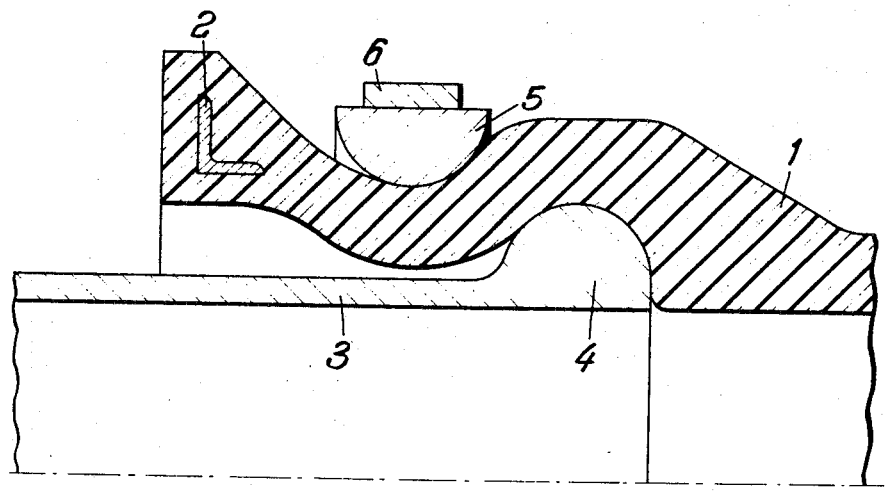

HOSE CONNECTION COUPLING

The present invention relates to a hose connection coupling for a flexible, textile fabric or equivalent material reinforced hose having a large diameter and made of rubber or rubberlike material for high operational pressures to hose-connecting branches or rigid conduits, herein both called conduits.

Hose connection couplings for relatively highly charged rubber hoses are known in different embodiments. In all these embodiments, in particular in hoses with a large diameter, the time-consuming mounting, as well as the likewise time-consuming dismantling of the connection branch which often causes hose damages, have been found to be a drawback.

The best and simplest possibility until now, to secure large hoses, for instance, for suction dredges with 400 mm. inner diameter and more for relatively high operational pressures onto the connection branch, is the use of normally divided hose clamps. For obtaining the required engagement friction and thereby the sealing between the hose and the connection branch, a plurality of clamps must be provided which are disposed about the connection point and then tensioned.

Furthermore, hose connection couplings are known in which the connection branch has at its end a bead and which at the hose slid over the bead is pressed behind the bead with one or a plurality of clamps or the like rigidly against the branch connection.

All these clamps must be tightened, however, shortly after the mounting rather often, since, due to the flow occurrences of the hose material otherwise nonsealing points and destructions in the connection branch can occur.

Synthetic material hoses have also been prepared already, at the ends of which an annular stiffening means is worked in. With this stiffening means, a shrinking of the hose diameter at the hose ends during the cooling periods after the production, as well as a tearing of these ends, for example, during the mounting of the hose on a connecting branch should be prevented.

It is one object of the present invention to provide a hose connection coupling for connection of a flexible textile fabric or equivalent material reinforced large hose with a large diameter for high operational pressures such, that the sealing effect increases with increasing operation pressure.

It is another object of the present invention to provide a hose connection coupling, wherein the tube end and the connection branch end, respectively, have a strong bead, the inner diameter of the end of the hose is slightly larger than the greatest diameter of the bead, the hose has at its end range a stiffening means retaining the diameter and assuming the forces transmitted from the hose textile material, and the hose is in its jointed position between the bead and the stiffening means constricted by a clamping element, whereby the inner wall of the hose on the constriction does not engage or does not engage with transmission of forces, that means positively or nonpositively, on the outer wall of the tube.

In accordance with a preferred embodiment, the clamplike element comprises pressure members adjusted to the outer shape of the hose constriction and a pulling band, whereby the latter can be made of profile steel, a wire cable or a chain. In accordance with the present invention there is provided a hose connection coupling for connection of a reinforced hose having a large diameter for high operational pressures to conduits, wherein the end of the conduits are formed with a strong bead extending outwardly therefrom on its outer periphery, the inner diameter of the end of the hose being slightly larger than the largest diameter of the bead, the hose having in its end range a stiffening means retaining the diameter and assuming the forces transmitted from the hose. A clamplike member constricts the hose in its coupled position between the bead and the stiffening means and forms a constriction thereat, the clamplike member adjusting to the resulting shape of the hose; and the inner diameter of the constriction is substantially smaller than the largest diameter of the bead.

With these and other objects in view, which will become apparent in the following detailed description, the present invention, which is shown by example only, will be clearly understood in connection with the accompanying drawing, in which:

FIG. 1 is an axial section of a hose sleeve slit over a connection branch prior to application of the clamplike member; and FIG. 2 is an axial section of a hose sleeve constricted by a clamplike element and moved over a connection branch.

Referring now to the drawing, the hose connection coupling comprises a hose 1 reinforced with a textile material or equivalent material formed as a sleeve. In the end of the hose 1 a stiffening member 2 is worked in, designed to maintain the diameter, which stiffening member 2 assumes fully the forces transmitted onto the stiffening member 2 by the hose textile material or equivalent material axially or similarly directed. A completely smooth connection branch or conduit 3 has at its end a strong bead 4, the largest diameter of which is slightly smaller than the inner diameter of the sleeve at the end of the hose 1, in order to slide the latter easily over the bead 4 on the connection branch 3. The sleeve part is so long, that with a clamplike element 5 and 6 disposed around the hose 1 between the stiffening member 2 and the bead 4, the hose 1 can be constricted annularly to an extent with a low exertion of force, that the constriction with its inner diameter is substantially smaller than the largest diameter of the bead 4 of the connection branch 3. As can be ascertained from FIG. 2, the inner wall of the hose 1 must not engage and must not transmit forces on the constriction, respectively, on the outer wall of the connection branch 3. The clamplike element, which for avoidance of hose damages engages preferably on the resulting hose shape, can be formed of a plurality of pressure members 5 and an elastic pulling band 6, of a wire cable, or a chain or of a combination of these parts.

With the present invention an extremely simple hose connection coupling is obtained which, as to its sealing effect, increases with increasing operational pressure, which hose connection coupling can be easily mounted and which makes possible by releasing of the clamplike element, an easy removal of the end of the hose from the connection branch.

It is also of advantage that, in the dismantled state, the clamplike element must not be removed from the hose, since it can remain due to the thickened form-maintaining hose end loosely, however, without danger that it will be lost about the hose.

While I have disclosed one embodiment of the present invention, it is to be understood that this embodiment is given by example only and not in a limiting sense.

I claim:

1. A hose connection coupling for connection of a flexible reinforced hose having a large diameter for high operational pressures to a conduit, wherein:
   the end of said conduit has a strong bead extending outwardly therefrom on its outer periphery;
   the inner diameter of the end of said hose being slightly larger than the largest diameter of said bead;
   said hose having in its end range a stiffening means retaining the diameter of the hose in its end range and assuming the forces transmitted from said hose;
   a clamplike member constricting said hose in its coupled position between said bead and said stiffening means and forming a constriction thereat the inner diameter of said constriction being radially spaced from said conduit, said clamplike member adjusting to the resulting shape of said hose; and
   the inner diameter of said constriction is substantially smaller than said largest diameter of said bead.

2. The hose connection coupling, as set forth in claim 1, wherein said clamplike member comprises pressure members.

3. The hose connection coupling, as set forth in claim 4, wherein said pull band comprises a profile-steel.

4. The hose connection coupling, as set forth in claim 2 wherein said pull band comprises a wire cable.

5. The hose connection coupling, as set forth in claim 2, wherein said pull band comprises a chain.